United States Patent
Min et al.

(10) Patent No.: US 9,540,047 B2
(45) Date of Patent: Jan. 10, 2017

(54) VEHICLE BODY REINFORCING STRUCTURE FOR COPING WITH FRONT COLLISION

(71) Applicant: Hyundai Motor Company, Seoul (KR)

(72) Inventors: Huen Sick Min, Whasung-Si (KR); Dae Won Kim, Whasung-Si (KR); Dong Oh Lee, Whasung-Si (KR); Kang Hyuck Kwon, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/856,204

(22) Filed: Sep. 16, 2015

(65) Prior Publication Data

US 2016/0090126 A1 Mar. 31, 2016

(30) Foreign Application Priority Data

Sep. 30, 2014 (KR) .................. 10-2014-0130906

(51) Int. Cl.
| | |
|---|---|
| *B60N 99/00* | (2006.01) |
| *B62D 25/08* | (2006.01) |
| *B62D 25/04* | (2006.01) |
| *B62D 25/14* | (2006.01) |

(52) U.S. Cl.
CPC ............. *B62D 25/081* (2013.01); *B62D 25/04* (2013.01); *B62D 25/14* (2013.01)

(58) Field of Classification Search
CPC ........ B60D 25/081; B60D 25/04; B60D 25/14
See application file for complete search history.

(56) References Cited

U.S. PATENT DOCUMENTS

| | | | |
|---|---|---|---|
| 5,052,742 A | 10/1991 | Akoshima et al. | |
| 6,921,126 B2 * | 7/2005 | Suh ....................... | B62D 25/088 296/187.09 |
| 2014/0152044 A1 * | 6/2014 | Kaneko .................. | B62D 25/14 296/72 |

FOREIGN PATENT DOCUMENTS

| | | |
|---|---|---|
| KR | 10-2004-0029778 A | 4/2004 |
| KR | 10-2006-0003271 A | 1/2006 |

\* cited by examiner

*Primary Examiner* — Lori L Lyjak
(74) *Attorney, Agent, or Firm* — Morgan, Lewis & Bockius LLP

(57) ABSTRACT

A vehicle body reinforcing structure for coping with a front collision may include a cowl panel extended in a width direction of a vehicle, cowl side upper members coupled to front end portions of both sides of the cowl panel in the width direction of the vehicle and extended in a length direction of the vehicle, fender apron upper members extended in the length direction of the vehicle and coupled to front end portions of a front of the cowl side upper members in the length direction of the vehicle, and side outer panels extended in a height direction of the vehicle and connected to the front end portions of both sides of the cowl panel in the width direction of the vehicle and the cowl side upper members.

18 Claims, 23 Drawing Sheets

SECTION A-A

SECTION B-B

VEHICLE BODY REINFORCING STRUCTURE FOR COPING WITH FRONT COLLISION

CROSS-REFERENCE TO RELATED APPLICATION

The present application claims priority to Korean Patent Application No. 10-2014-0130906 filed Sep. 30, 2014, the entire contents of which is incorporated herein for all purposes by this reference.

BACKGROUND OF THE INVENTION

1. Field of the Invention

The present invention relates to a vehicle body structure for coping with front collision. More particularly, the present invention relates to a vehicle body reinforcing structure for coping with front collision capable of effectively improving performance for coping with collision in the case in which a vehicle offset-collides with an object at an outside portion of a vehicle body.

2. Description of the Related Art

Generally, a front vehicle body of a vehicle, which is a frame structure positioned at the front in a length direction of the vehicle to form an engine compartment, includes a front end module forming the front of the engine compartment and having a cooling module, a head lamp, and the like, mounted therein, a front fender apron member forming left and right side portions of the engine compartment, having a suspension system mounted therein, and providing spaces in which vehicle wheels are installed, a dash panel positioned at the rear of the engine compartment and partitioning a cabin and the engine compartment from each other, a cowl member positioned above the dash panel and partitioning, together with the dash panel, the engine compartment and the cabin from each other, and the like.

In addition, front side members extended in the length direction of the vehicle are disposed at left and right sides below the engine compartment to enhance structural rigidity of the front vehicle body, and a sub frame is disposed below the front side members in order to mount and support an engine installed in the engine compartment, a transmission, and the suspension system, and the like.

A front end portion of the front side member is mounted with a bumper beam extended in a width direction of the vehicle in order to improve performance for coping with front collision of the vehicle, and the bumper beam is connected to the front end portion of the front side member in the length direction of the vehicle with a crash box interposed therebetween.

In the case in which the vehicle including the front vehicle body having the structure as described above front-offset-collides with an object such as an obstacle or another vehicle on an outside portion of the vehicle body during being driven, it has been required to effectively disperse impact energy.

That is, in the case in which the object to be collided collides with the front side member in a state in which the object to be collided is only partially overlapped with the front side member or the object to be collided avoids the front side member to collide with a fender apron disposed at the outside portion of the vehicle body as compared with the front side member, there is a need to effectively transfer impact energy applied to the fender apron to a cowl and a side outer panel connected to the fender apron to efficiently disperse and absorb the impact energy, thereby safely protecting passengers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle body reinforcing structure for coping with front collision having advantages of safely protecting passengers by efficiently transferring and dispersing impact energy applied to a fender apron to a cowl member and a side outer panel in the case in which a vehicle offset-collides with another vehicle or an object at an outside portion of a vehicle body, such that the impact energy is applied to the fender apron.

According to various aspects of the present invention, a vehicle body reinforcing structure for coping with front collision may include a cowl panel extended in a width direction of a vehicle, cowl side upper members coupled to front end portions of both sides of the cowl panel in the width direction of the vehicle and extended in a length direction of the vehicle, fender apron upper members extended in the length direction of the vehicle and coupled to front end portions of a front of the cowl side upper members in the length direction of the vehicle, and side outer panels extended in a height direction of the vehicle and connected to the front end portions of both sides of the cowl panel in the width direction of the vehicle and the cowl side upper members, in which each cowl side upper member may be connected to the cowl panel so as to transfer a load to each cowl side upper member through a first load transfer path and may be connected to each side outer panel so as to transfer a load to each side outer panel through a second load transfer path, each side outer panel may have a front surface directed toward a front in the length direction of the vehicle and a side surface directed toward a side of the vehicle, and the second load transfer path may include a 2-1-th load transfer path formed by connecting each cowl side upper member to the front surface of the side outer panel, and a 2-2-th load transfer path formed by connecting each cowl side upper member to the side surface of the side outer panel, and each cowl side upper member may further include a reinforcing member connected to each fender apron upper member and the front surface of the side outer panel to form the 2-1-th load transfer path.

The first and second load transfer paths may simultaneously receive the load transferred from the fender apron upper member and disperse the load.

The first and second load transfer paths may disperse the load transferred from the fender apron upper member to two parts to substantially form a "Y" shape.

Each cowl side upper member may be formed in a box shape, each cowl side upper member may include a front portion and a rear portion positioned at a front and a rear, respectively, in the length direction of the vehicle, and may be formed so that a width thereof is expanded from the front portion toward the rear portion.

Each cowl side upper member may include a cowl side upper inner member connected to each of the respective fender apron upper member and the cowl panel to form the first load transfer path.

Each cowl side upper inner member may include a member body having a first surface extended in the height direction and the length direction of the vehicle and having a plate shape and a second surface bent and extended from one side edge of the first surface in the width direction of the vehicle and having a plate shape and substantially formed in an "L" shape, and a plurality of flanges formed integrally with the member body so as to be bent from the member body and attached to the cowl panel by welding.

The second surface may have a hole for a welding gun formed therein so as to penetrate therethrough.

The reinforcing member may include a member body having a first surface extended in the height direction and the length direction of the vehicle and having a plate shape and a second surface bent and extended from one side edge of the first surface in the width direction of the vehicle and having a plate shape and substantially formed in an "L" shape, and a plurality of flanges formed integrally with the member body so as to be bent from the member body and attached to the front surface of the respective side outer panel by welding.

The first surface may be provided with a plurality of beads extended in the length direction of the vehicle in order to reinforce rigidity, the plurality of beads being disposed so as to be spaced from each other by predetermined spaces in the height direction of the vehicle.

Each cowl side upper member may further include a cowl side upper outer member connected to the respective fender apron upper member and the side surface of the side outer panel to form the 2-2-th load transfer path.

Each cowl side upper outer member may include a member body extended in the height direction and the length direction of the vehicle and having a trapezoidal plate shape, first to third flanges bent and extended from edges of the member body, and a fourth flange formed integrally with the member body so as to be extended from an edge of the member body, the member body being formed so that a width thereof may be expanded from a front portion thereof in the length direction of the vehicle toward a rear portion thereof.

The member body may be provided with a first bead protruding inwardly in the width direction of the vehicle and extended in the length direction of the vehicle, and may be provided with a second bead protruding outwardly in the width direction of the vehicle and extended from the fourth flange in the length direction of the vehicle.

Each side outer panel may be connected to a front pillar disposed at a front in the length direction of the vehicle.

Each cowl side upper member may further include a cowl side upper lower member connected to each of the respective fender apron upper member, the cowl panel, and the respective side outer panel to form a fourth load transfer path.

Each cowl side upper lower member may include a member body having a first surface extended in the height direction and the length direction of the vehicle and having a plate shape and a second surface bent and extended from one side edge of the first surface in the height direction of the vehicle and having a plate shape and substantially formed in an "L" shape, and a plurality of flanges formed integrally with the member body so as to be extended from the member body, in which the plurality of flanges may include a first flange extended from the first surface to the second surface and bonded to the respective fender apron upper member, a second flange extended from the second surface and bonded to a first surface of the reinforcing member, a third flange bent and extended from one side edge of the second surface and attached to the cowl panel, a fourth flange bent and extended from an upper end portion of the second surface and attached to the front surface of the respective side outer panel, and a fifth flange bent from one side edge of the first surface and attached to the front surface of the respective side outer panel.

A triple load transfer path configured to transfer an impact load of the fender apron upper member from the fender apron upper member to the front surface of the side outer panel in the length direction of the vehicle may be formed, the triple load transfer path may include an upper load transfer path, a lower load transfer path, and a central load transfer path in the height direction of the vehicle and may be formed by the cowl side upper lower member and the reinforcing member each having first ends attached to the fender apron upper member and second ends attached to the front surface of the side outer panel.

Each fender apron upper member may have a structure of a rectangular box shape, and include a fender apron upper inner member having upper and lower surfaces of the rectangular box shape in the height direction of the vehicle, an inner side surface of the rectangular box shape in the width direction of the vehicle, a substantially "C" shaped cross section, and an opened surface of the rectangular box shape opened outwardly in the width direction of the vehicle, a fender apron upper outer member coupled to the fender apron upper inner member so as to close the opened surface of the fender apron upper inner member in order to form an outer side surface of the rectangular box shape in the width direction of the vehicle, a front bracket disposed at a front in the length direction of the vehicle and coupled to the fender apron upper inner member and the fender apron upper outer member so as to close a front opening part formed by the fender apron upper inner member and the fender apron upper outer member, and a reinforcing bracket inserted into an internal space formed by coupling the fender apron upper inner member and the fender apron upper outer member to each other to thereby be coupled to the fender apron upper inner member and the fender apron upper outer member.

The reinforcing bracket may include a bracket body having a rectangular flat panel shape, an upper flange bent perpendicularly along an upper edge of the bracket body, formed integrally with the bracket body, and coupled to the upper surface of the fender apron upper inner member, a lower flange bent perpendicularly along a lower edge of the bracket body, formed integrally with the bracket body, and coupled to the lower surface of the fender apron upper inner member, an inner flange bent perpendicularly along an inner edge of the bracket body, formed integrally with the bracket body, and coupled to the inner side surface of the fender apron upper inner member by welding, and an outer flange bent perpendicularly along an outer edge of the bracket body, formed integrally with the bracket body, and coupled to an inner side surface of the fender apron upper outer member by welding.

With the vehicle body reinforcing structure for coping with front collision according to various embodiments of the present invention, the impact load applied to the fender apron upper member at the time of occurrence of a collision accident of the vehicle is effectively dispersed to and absorbed by the cowl panel and the side outer panel via the cowl side upper member through the fender apron upper member, thereby making it possible to safely protect passengers.

In addition, the impact load is appropriately dispersed and absorbed, thereby making it possible to prevent excessive damage to the vehicle body and decrease damage to components of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
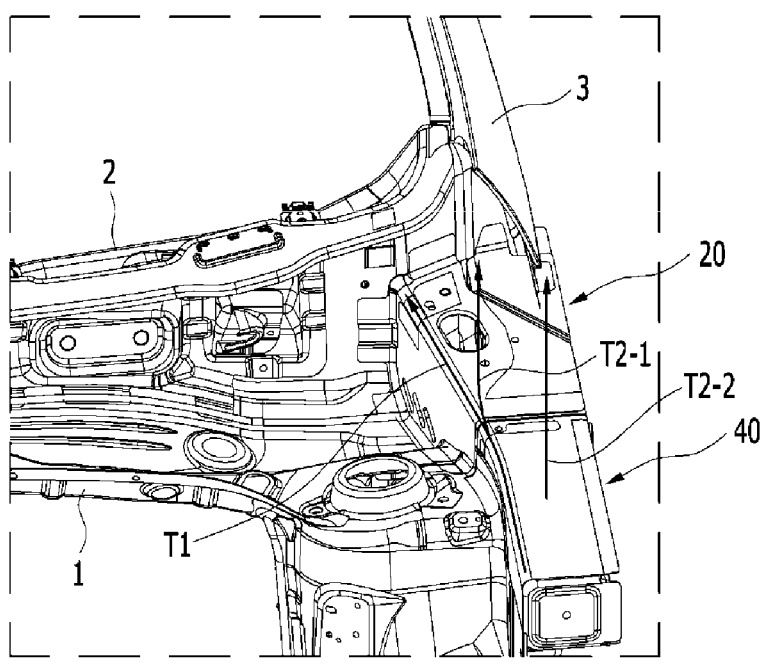
FIG. 1 is a front perspective view of an exemplary vehicle body reinforcing structure for coping with a front collision according to the present invention.
Figure 2:
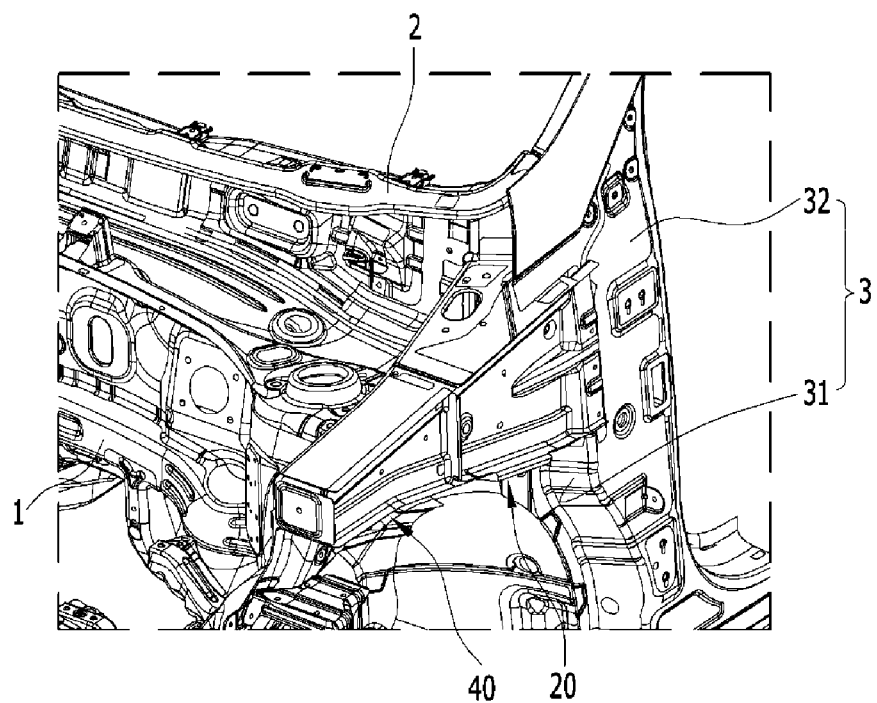
FIG. 2 is a side perspective view of the exemplary vehicle body reinforcing structure for coping with the front collision according to the present invention.

Referring to FIG. 1 and FIG. 2, a front vehicle body to which various embodiments of the present invention is applied may include a dash panel 1 partitioning an engine compartment and a cabin from each other, a cowl panel 2 substantially extended in a width direction of a vehicle and coupled integrally with an upper portion of the dash panel 1 in a height direction of the vehicle, and side outer panels 3 disposed at an outer side in the width direction of the vehicle and extended in the length direction of the vehicle to thereby be coupled to the dash panel 1 and the cowl panel 2.

Cowl side upper members 20 may be extended in the length direction of the vehicle and may include front end portions and rear end portions positioned at the front and the rear, respectively, in the length direction of the vehicle, wherein the rear end portions may be coupled to front end portions of both sides of the cowl panel 2 in the width direction of the vehicle and the side outer panel, respectively.

Fender apron upper members 40 may be extended in the length direction of the vehicle and may include front end portions and rear end portions positioned at the front and the rear, respectively, in the length direction of the vehicle, wherein rear end portions may be inserted into and be coupled integrally with the front end portions of the cowl side upper members 20.

The cowl side upper member 20 may be coupled to the cowl panel 2 to form a first load transfer path T1 absorbing an impact load transferred through the fender apron upper member 40 at the time of occurrence of a collision accident of the vehicle and then transferring the impact load to the cowl panel 2.

The side outer panel 3 may have a front surface 31 directed toward the front in the length direction of the vehicle and a side surface 32 directed toward a side of the vehicle and may be coupled to a front pillar of the vehicle.

The cowl side upper member 20 may be coupled to the front surface 31 of the side outer panel 3 to form a 2-1-th load transfer path T2-1 absorbing the impact load transferred through the fender apron upper member 40 and then transferring the impact load to the side outer panel 3.

The cowl side upper member 20 may be coupled to the side surface 32 of the side outer panel 3 to form a 2-2-th load transfer path T2-2 absorbing the impact load transferred through the fender apron upper member 40 and then transferring the impact load to the side outer panel 3.

The first load transfer path T1 and the 2-1-th load transfer path T2-1 may disperse the impact load transferred from the fender apron upper member 40 to two parts to substantially form a "Y" shape.

Figure 3:
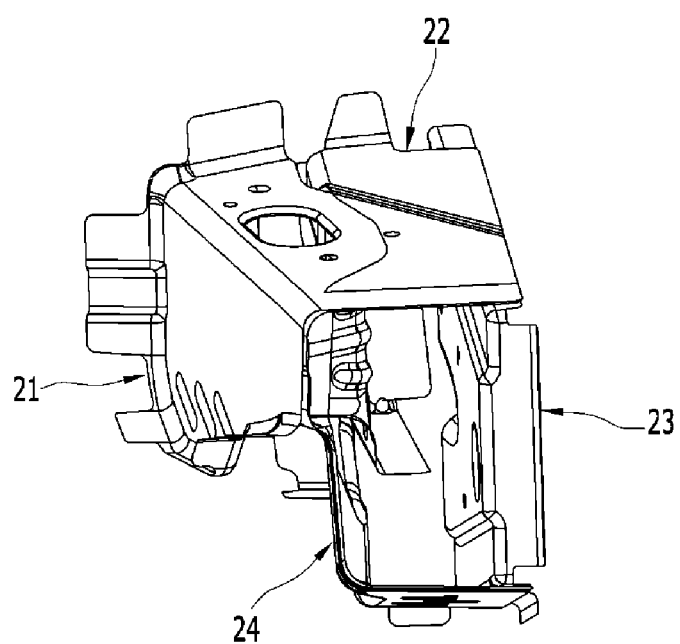
FIG. 3 is a perspective view of a cowl side upper member according to the present invention.
Figure 4:
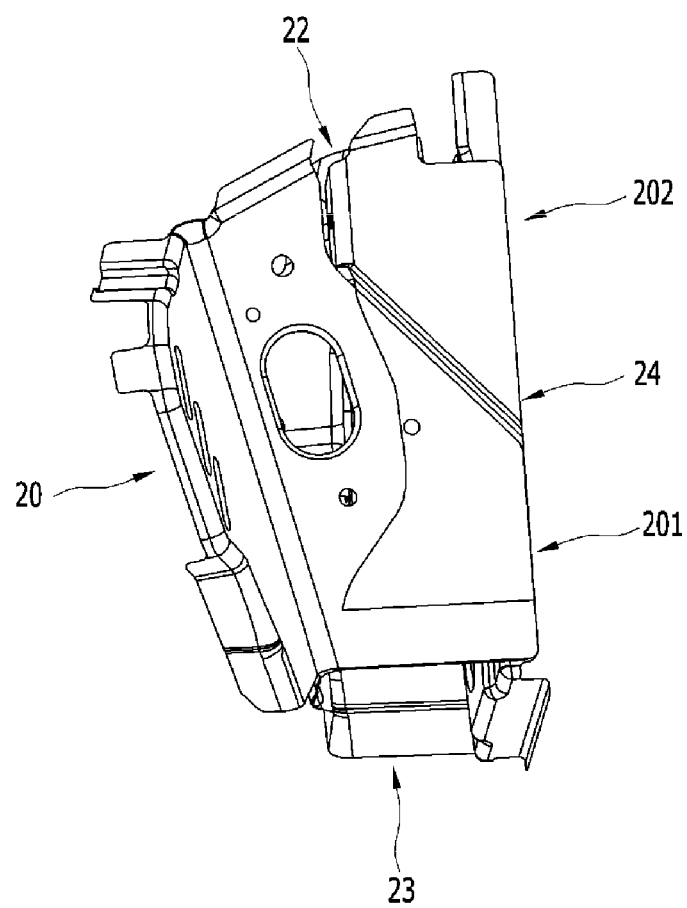
FIG. 4 is a plan view of the cowl side upper member according to the present invention.

Referring to FIG. 3 and FIG. 4, the cowl side upper member 20 may be formed in a box shape.

The cowl side upper member 20 may include a front portion 201 and a rear portion 202 positioned at the front and the rear, respectively, in the length direction of the vehicle, and may be formed so that a width thereof is expanded from the front portion 201 toward the rear portion 202.

The cowl side upper member 20 may include a cowl side upper inner member 21.

Figure 5:
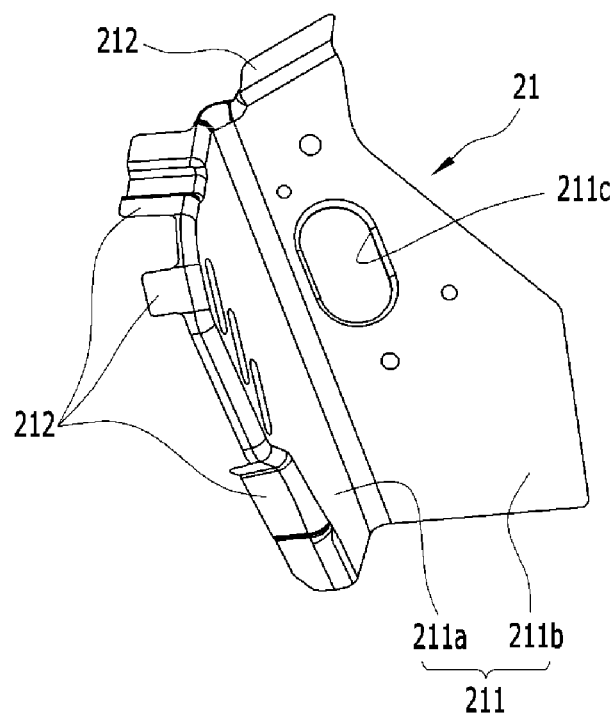
FIG. 5 is a perspective view of a cowl side upper inner member according to the present invention.
Figure 6:
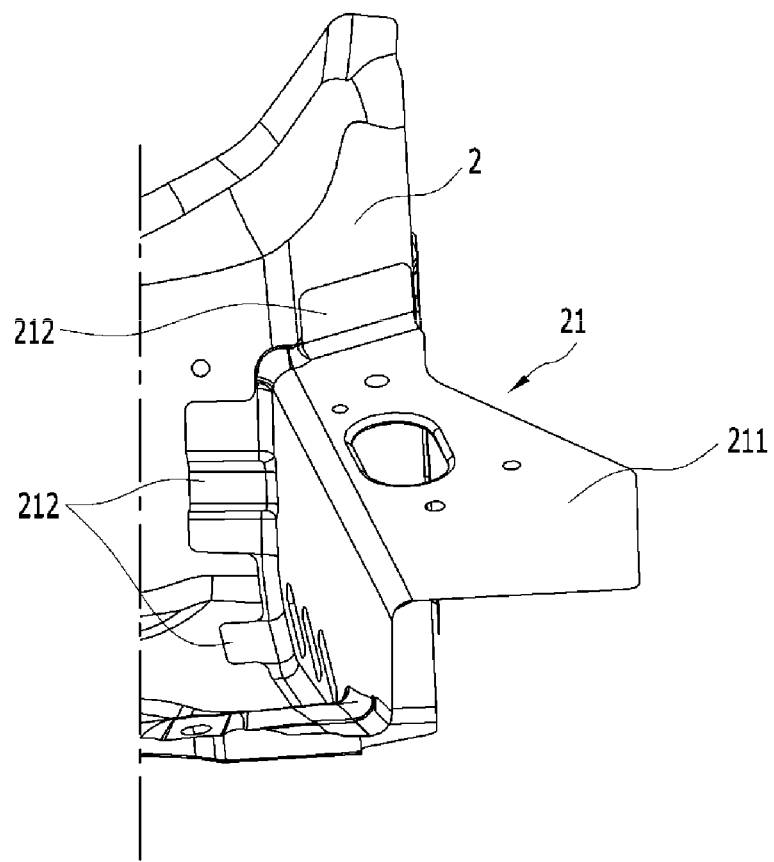
FIG. 6 is a perspective view showing a state in which the cowl side upper inner member is attached to a cowl panel according to the present invention.

Referring to FIG. 5 and FIG. 6, the cowl side upper inner member 21 may include a member body 211 having a first surface 211*a* extended in the height direction and the length direction of the vehicle and having a plate shape and a second surface 211*b* bent and extended from one side edge of the first surface in the width direction of the vehicle and having a plate shape and substantially formed in an "L" shape, and a plurality of flanges 212 formed integrally with the member body 211 so as to be bent from the member body 211 and attached to the cowl panel 2 by welding.

A hole 211*c* for a welding gun into which a welding gun may be inserted may be formed in an oval shape in the second surface 211*b* so as to penetrate through the second surface 211*b*.

The member body 211 has one end coupled to the fender apron upper member 40 and the other end coupled to the cowl panel 2 to form the first load transfer path T1 receiving the impact load transferred from the fender apron upper member 40 and transferring the impact load to the cowl panel 2.

The cowl side upper member 20 may include a reinforcing member 22.

Figure 7:
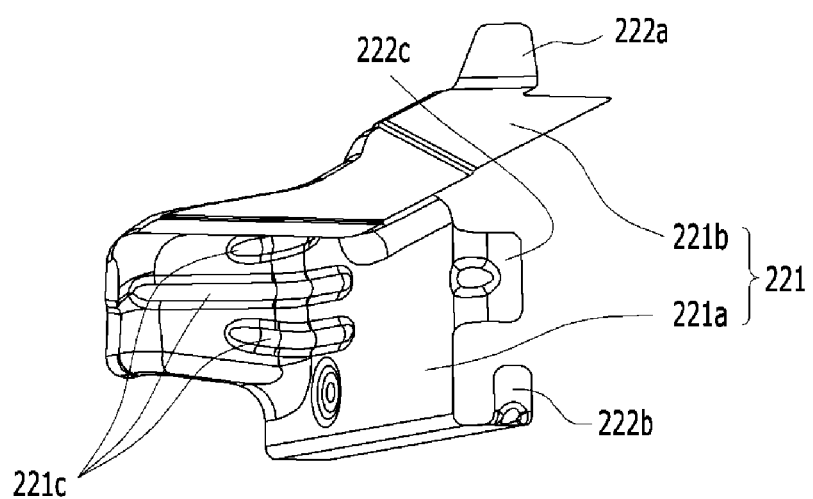
FIG. 7 is a perspective view of a reinforcing member according to the present invention.
Figure 8:
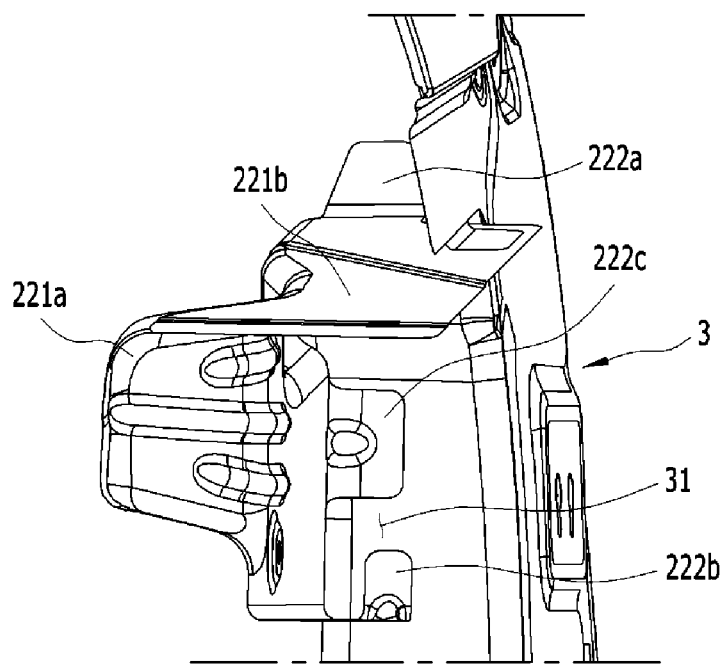
FIG. 8 is a perspective view showing a state in which the reinforcing member is attached to a side outer panel according to the present invention.

Referring to FIG. 7 and FIG. 8, the reinforcing member 22 may include a member body 221 having a first surface 221*a* extended in the height direction and the length direction of the vehicle and having a plate shape and a second surface 221*b* bent and extended from one side edge of the first surface 221*a* in the width direction of the vehicle and having a plate shape and substantially formed in an "L" shape, and a plurality of flanges formed integrally with the member body 221 so as to be bent from the member body 221 and attached to the front surface 31 of the side outer panel 3 by welding.

The plurality of flanges may include an upper flange 222*a* disposed at an upper portion in the height direction of the vehicle, a lower flange 222*b* disposed at a lower portion in the height direction of the vehicle, and an intermediate flange 222*c* disposed between the upper flange 222*a* and the lower flange 222*b*, respectively.

The first surface 221*a* may be provided with a plurality of beads 221*c* extended in the length direction of the vehicle in order to reinforce rigidity, wherein the plurality of beads 221*c* may be disposed so as to be spaced from each other by predetermined spaces in the height direction of the vehicle.

The reinforcing member 22 has one end coupled to the fender apron upper member 40 and the other end coupled to the side outer panel 3 to form the 2-1-th load transfer path T2-1 receiving the load transferred from the fender apron upper member 40 and transferring the load to the side outer panel 3.

Figure 9:
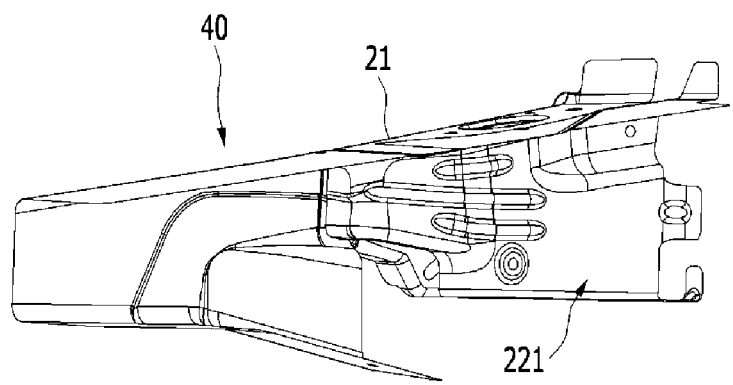
FIG. 9 is a perspective view showing a state in which the cowl side upper inner member and the reinforcing member are coupled to a fender apron upper inner member according to the present invention.

Referring to FIG. 9, a rear end portion of the fender apron upper member 40 is inserted into and is coupled integrally with the cowl side upper inner member 21 and a front end portion of the member body 211 of the reinforcing member 22 is overlapped with and is coupled integrally with an inner side surface of the rear end portion of the fender apron upper member 40 by welding, such that the impact load transferred from the fender apron upper member 40 is substantially dispersed in a "Y" shape through the cowl side upper inner member 21 and the reinforcing member 22 and is then transferred to the cowl panel 2 and the side outer panel 3.

Figure 10:
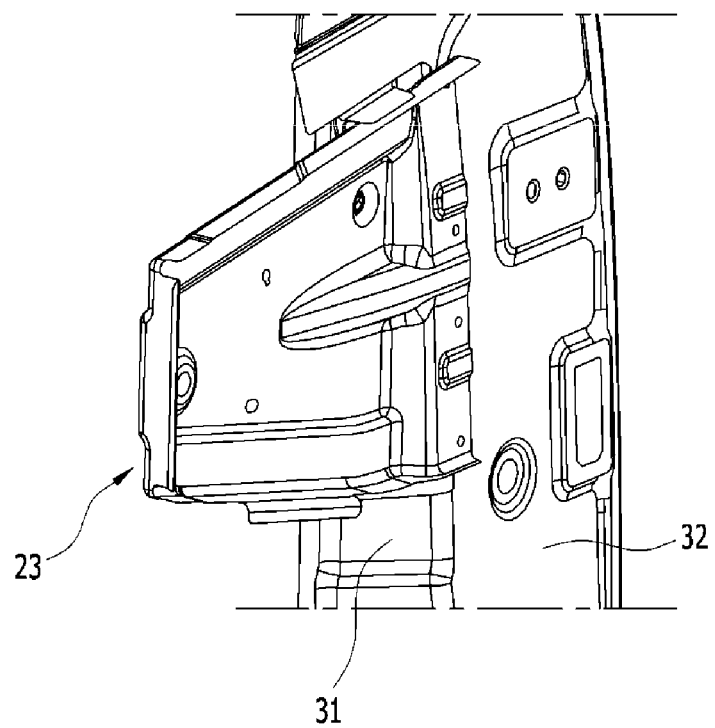
FIG. 10 is a perspective view showing a state in which a cowl side upper outer member is attached to the side outer panel according to the present invention.

Referring to FIG. 10, the cowl side upper member 20 may include a cowl side upper outer member 23.

A front portion of the cowl side upper outer member 23 in the length direction of the vehicle is coupled to the fender apron upper member 40 and a rear portion thereof is coupled to the side surface 32 of the side outer panel 3 to form the 2-2-th load transfer path T2-2 transferring the load transferred from the fender apron upper member 40 to the side outer panel 3.

Figure 11:
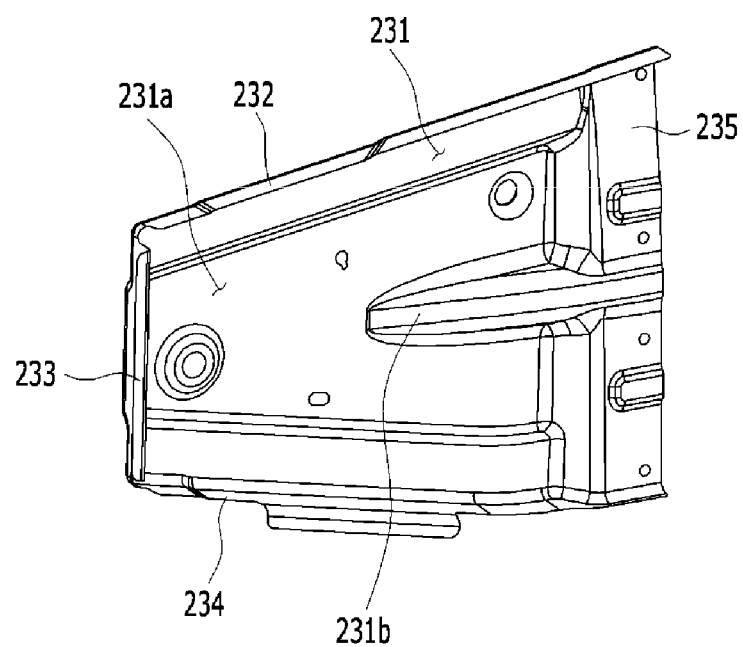
FIG. 11 is a perspective view of the cowl side upper outer member according to the present invention.

Referring to FIG. 11, the cowl side upper outer member 23 may include a member body 231 extended in the height direction and the length direction of the vehicle and having a trapezoidal plate shape, first to third flanges 232 to 234 bent and extended from edges of the member body 231, and a fourth flange 235 formed integrally with the member body 231 so as to be extended from an edge of the member body 231.

The member body 231 may be formed so that a width thereof is expanded from a front portion thereof in the length direction of the vehicle toward a rear portion thereof.

The member body 231 is provided with a first bead 231*a* protruding inwardly in the width direction of the vehicle and extended in the length direction of the vehicle to reinforce rigidity of the member body 231.

The member body 231 is provided with a second bead 231*b* protruding outwardly in the width direction of the vehicle and extended from the fourth flange 235 in the length direction of the vehicle to reinforce rigidity of the member body 231 and the fourth flange 235.

The first flange 232 may be bonded to the reinforcing member 22, the second flange 233 may be bonded to the fender apron upper member 40, the third flange 234 may be bonded to a cowl side upper lower member 24 to be described below, and the fourth flange 235 may be bonded to the side surface 32 of the side outer panel 3.

Figure 12:
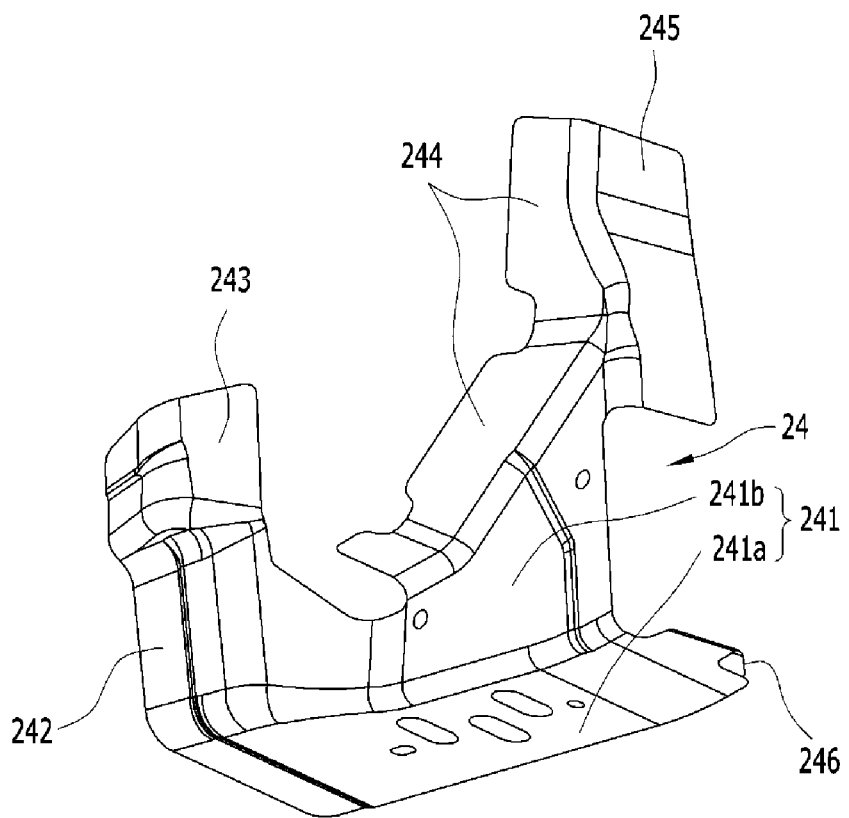
FIG. 12 is a perspective view of a cowl side upper lower member according to the present invention.

Referring to FIG. 12, the cowl side upper member 20 may include a cowl side upper lower member 24.

The cowl side upper lower member 24 may include a member body 241 having a first surface 241a extended in the height direction and the length direction of the vehicle and having a plate shape and a second surface 241b bent and extended from one side edge of the first surface 241a in the height direction of the vehicle and having a plate shape and substantially formed in an "L" shape and a plurality of flanges formed integrally with the member body 241 so as to be extended from the member body 241.

Figure 13:
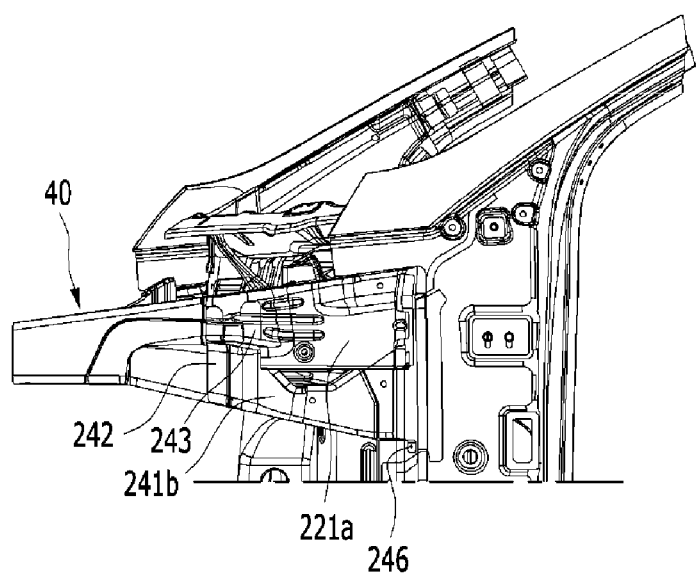
FIG. 13 is a perspective view showing a state in which the reinforcing member and the cowl side upper lower member are coupled to the fender apron upper inner member according to the present invention.
Figure 14:
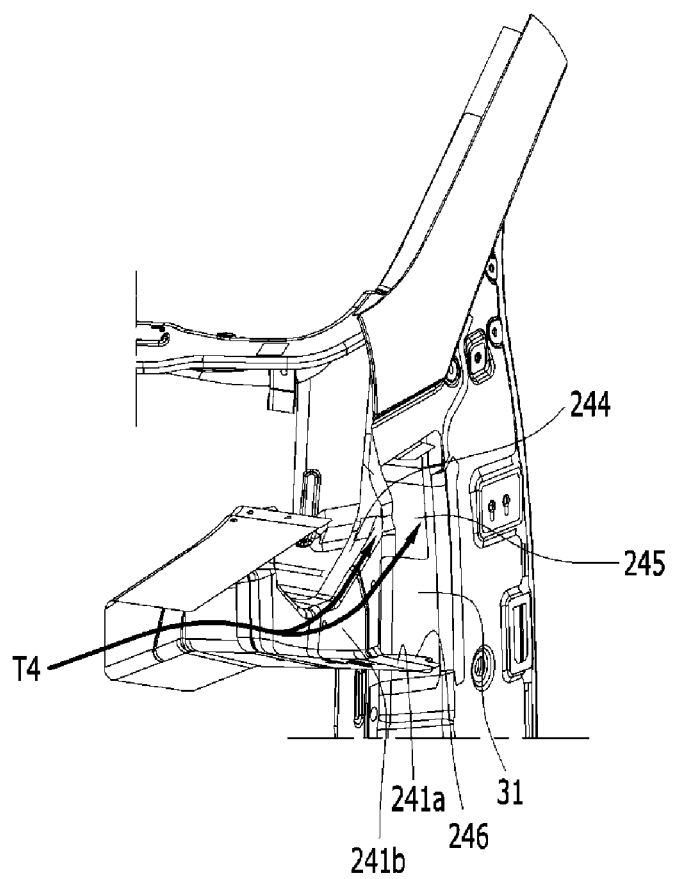
FIG. 14 is a perspective view showing a state in which the cowl side upper lower member is coupled to the fender apron upper inner member and the side outer panel according to the present invention.

The plurality of flanges may include a first flange 242 extended from the first surface 241a to the second surface 241b and bonded to the fender apron upper member 40, a second flange 243 extended from the second surface 241b and bonded to the first surface 221a of the reinforcing member 22, a third flange 244 bent and extended from one side edge of the second surface 241b and attached to the cowl panel 2 as shown in FIG. 14, a fourth flange 245 bent and extended from an upper end portion of the second surface 241b and attached to the front surface 31 of the side outer panel 3, and a fifth flange 246 bent from one side edge of the first surface 241a and attached to the front surface 31 of the side outer panel 3, as shown in FIG. 13.

The cowl side upper lower member 24 may form a fourth load transfer path T4 simultaneously transferring the load transferred from the fender apron upper member 40 to the cowl panel 2 and the side outer panel 3.

Figure 15:
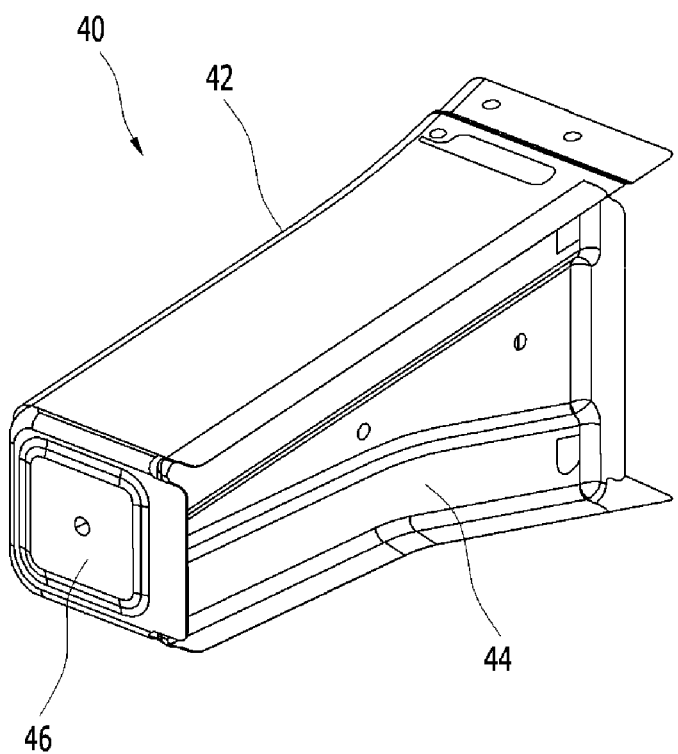
FIG. 15 is a perspective view of a fender apron upper member according to the present invention.
Figure 16:
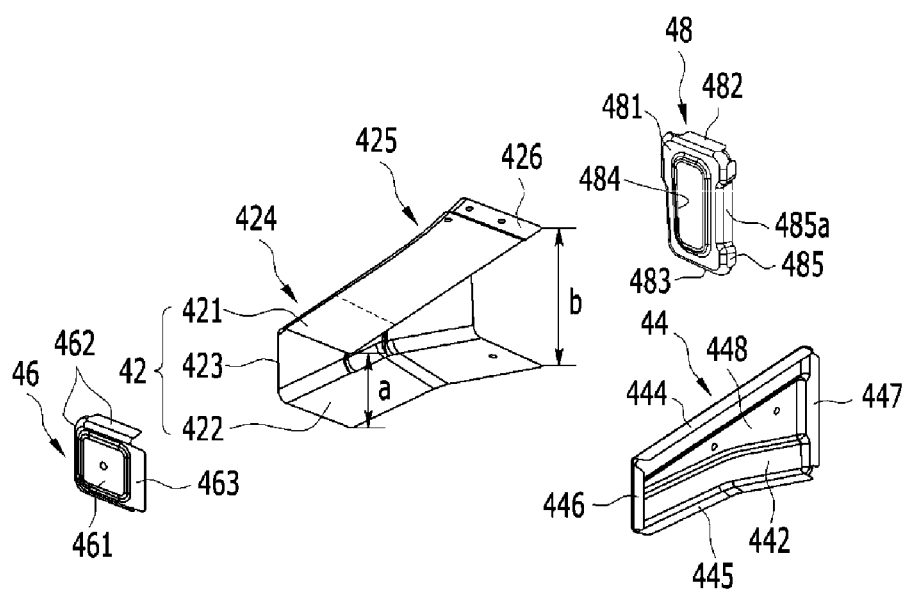
FIG. 16 is an exploded perspective view of the fender apron upper member according to the present invention.
Figure 17:
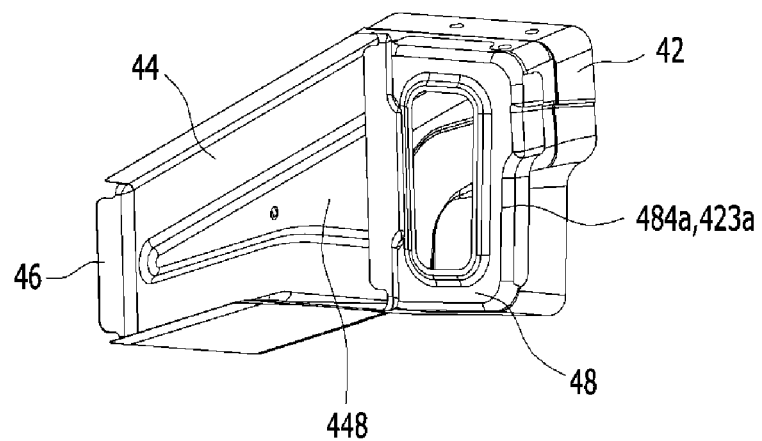
FIG. 17 is a perspective view showing a state in which a reinforcing bracket is coupled to the fender apron upper inner member according to the present invention.
Figure 18:
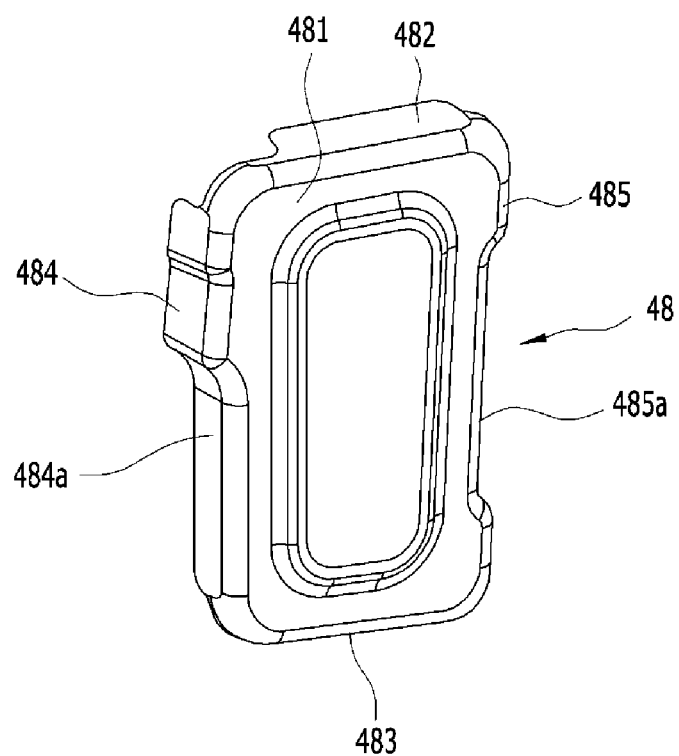
FIG. 18 is a perspective view of the reinforcing bracket according to the present invention.
Figure 19:
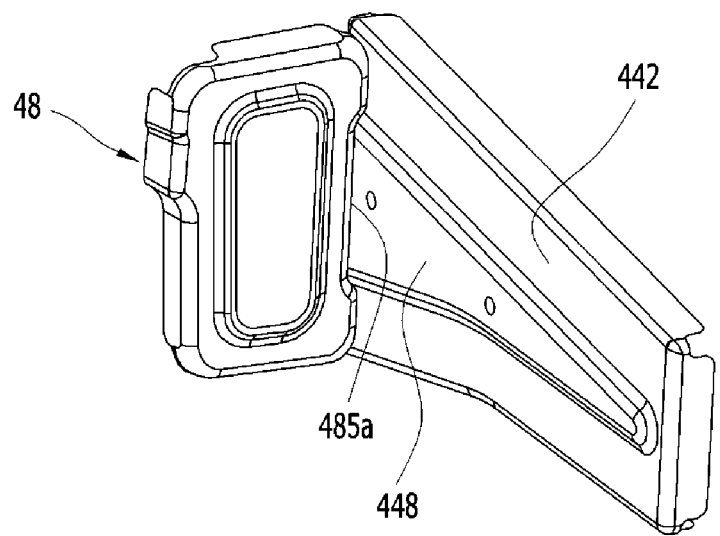
FIG. 19 is a perspective view showing a state in which the reinforcing bracket is coupled to a fender apron upper outer member according to the present invention.

Referring to FIG. 15 and FIG. 16, the fender apron upper member 40 may have a structure of a hexahedron in which a substantially rectangular-box-shaped cross section thereof is extended in the length direction of the vehicle.

The fender apron upper member 40 may include a fender apron upper inner member 42 of which a substantially "C"-shaped cross section is extended in the length direction of the vehicle.

The fender apron upper inner member 42 may have upper and lower surfaces 421 and 422 of the hexahedron in the height direction of the vehicle, an inner side surface 423 of the hexahedron in the width direction of the vehicle, and an opened surface of the hexahedron opened outwardly in the width direction of the vehicle.

The fender apron upper inner member 42 may be divided into a front portion 424 and a rear portion 425 in a length direction thereof, wherein the rear portion 425 may have a width b larger than a width a of the front portion 424.

A front end portion of the rear of the rear portion 425 may be provided with a flange 426 coupled to the cowl side upper member 20 by welding in a state in which the flange 426 is inserted into and overlapped with the cowl side upper member 20.

The fender apron upper member 40 may include a fender apron upper outer member 44 coupled to the fender apron upper inner member so as to close the opened surface of the fender apron upper inner member 42.

The fender apron upper outer member 44 may include a body 442 extended in the length direction of the vehicle and having a rectangular plate shape, and flanges extended along a rectangular edge of the body 442 and formed integrally with the body so as to be bent perpendicularly to the body.

The flanges may include an upper flange 444 overlapped with the upper surface 421 of the fender apron upper inner member 42 and coupled to the upper surface 421 of the fender apron upper inner member 42 by welding, a lower flange 445 overlapped with the lower surface 422 of the fender apron upper inner member 42 and coupled to the lower surface 422 of the fender apron upper inner member 42 by welding, a front flange 446 overlapped with one side edge of a front bracket 46 and coupled to one side edge of a front bracket 46 to be described below by welding, and a rear flange 447 overlapped with the cowl side upper member 20 and coupled to the cowl side upper member 20 by welding.

The fender apron upper outer member 44 may have a structure in which a rear portion thereof in the length direction of the vehicle has a width larger than that of a front portion thereof, similar to the fender apron upper inner member 42.

The body 442 of the fender apron upper outer member 44 may include a bead 448 that protrudes inwardly from an inner side surface of the body 442 in the width direction of the vehicle, is extended in the length direction of the vehicle, and has a shape in which a width thereof is expanded from the front toward the rear in the length direction of the vehicle.

The front bracket 46 may include a bracket body 461 having a rectangular flat panel shape, first flanges 462 bent perpendicularly along three edges of the bracket body 461, each overlapped with the upper surface 421, the lower surface 422, and the inner side surface 423 of the fender apron upper inner member, and each coupled to the upper surface 421, the lower surface 422, and the inner side surface 423 of the fender apron upper inner member by welding, and an extension surface 463 extended from one side edge of the bracket body 461 and coupled to the front flange 446 of the fender apron upper outer member 44 by welding.

The front bracket 46 is coupled to the fender apron upper inner member 42 and the fender apron upper outer member 44 so as to close a front opening part formed by the fender apron upper inner member 42 and the fender apron upper outer member 44.

A reinforcing bracket 48 may be inserted into an internal space formed by coupling the fender apron upper inner member 42 and the fender apron upper outer member 44 to each other and having a rectangular box shape to thereby be coupled to the fender apron upper inner member 42 and the fender apron upper outer member 44.

Referring to FIG. 16 to FIG. 19, the reinforcing bracket 48 may include a bracket body 481 having a rectangular flat panel shape, an upper flange 482 bent perpendicularly along an upper edge of the bracket body 481, formed integrally with the bracket body 481, and coupled to the upper surface 421 of the fender apron upper inner member 42 by welding, a lower flange 483 bent perpendicularly along a lower edge of the bracket body 481, formed integrally with the bracket body 481, and coupled to the lower surface 422 of the fender apron upper inner member 42 by welding, an inner flange 484 bent perpendicularly along an inner edge of the bracket body 481, formed integrally with the bracket body 481, and coupled to the inner side surface 423 of the fender apron upper inner member 42 by welding, and an outer flange 485 bent perpendicularly along an outer edge of the bracket body 481, formed integrally with the bracket body 481, and coupled to an inner side surface of the fender apron upper outer member 44 by welding.

The outer flange 485 may have a coupling groove 485a formed therein so as to be depressed inwardly in the width direction of the vehicle, wherein the coupling groove 485a has the bead 448 of the fender apron upper outer member 44 inserted thereinto and coupled thereto.

The inner flange 484 may also have a coupling groove 484a formed therein so as to be depressed outwardly in the width direction of the vehicle, such that a protrusion part 423a formed on the inner side surface 423 of the fender apron upper inner member 42 so as to protrude outwardly in the width direction of the vehicle may be inserted into and coupled to the coupling groove 484a.

The respective coupling grooves 484a and 485a increase coupling rigidity between the reinforcing bracket 48 and the fender apron upper inner member 42 and coupling rigidity between the reinforcing bracket 48 and the fender apron upper outer member 44.

Figure 20:
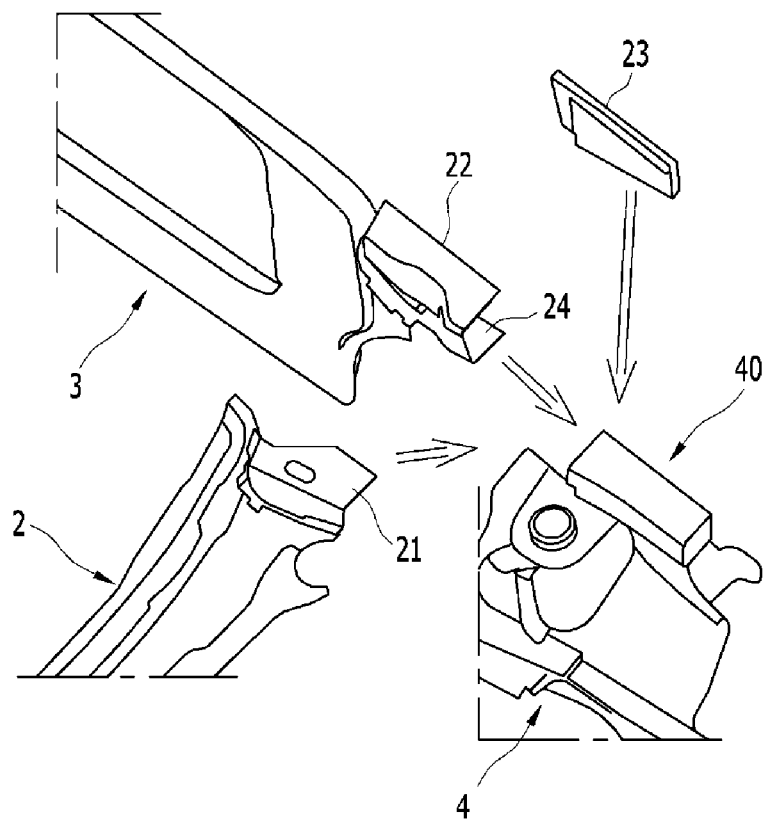
FIG. 20 is an exploded perspective view of the exemplary vehicle body reinforcing structure for coping with the front collision according to the present invention.

Referring to FIG. 20, the cowl side upper inner member 21 assembled to the cowl panel 2, the reinforcing member 22 and the cowl side upper lower member 24 assembled to the side outer panel 3, and the cowl side upper outer member 23 are assembled to the fender apron upper member 40 assembled to a fender apron assembly 4.

Since the reinforcing member 22 and the cowl side upper lower member 24 are coupled to the fender apron upper member 40 in a state in which they are first assembled to the side outer panel 3, coupling rigidity may be increased.

Figure 21A:
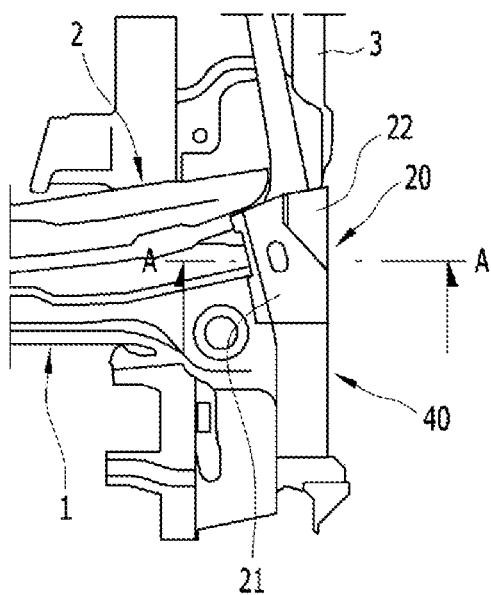
FIG. 21A and FIG. 21B are a plan view of the exemplary vehicle body reinforcing structure for coping with the front collision according to the present invention.
Figure 21B:
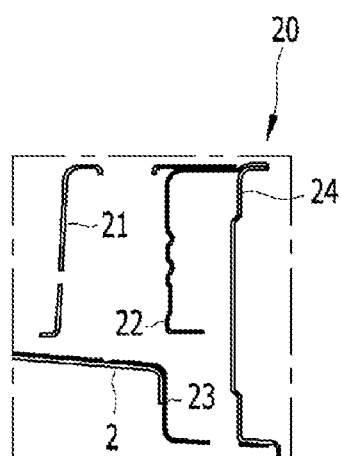

Referring to FIG. 21A and FIG. 21B, the cowl side upper member 20 may have a triple partition wall structure formed by the cowl side upper inner member 21, the reinforcing member 22, and the cowl side upper outer member 24, and the cowl side upper inner member 21 is coupled to the reinforcing member 22 in a state in which it is overlapped with the reinforcing member 22 at a wide area, such that coupling rigidity may be increased.

Figure 22:
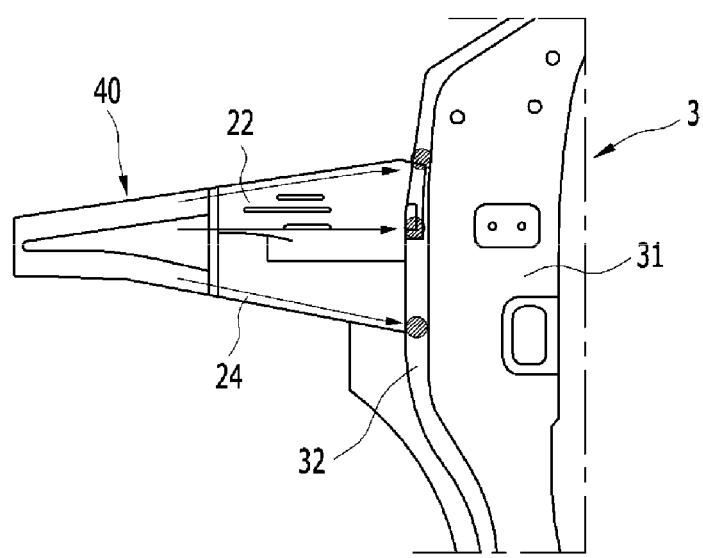
FIG. 22 is a side view of the exemplary vehicle body reinforcing structure for coping with the front collision according to the present invention.

Referring to FIG. 22, the other ends of the reinforcing member 22 and the cowl side upper lower member 24 each having one ends connected to the fender apron upper member 40 are connected to each of an upper portion, a lower portion, and a central portion, in the height direction of the vehicle, of the front surface 31 of the side outer panel 3 in the length direction of the vehicle to transfer the impact load transferred from the fender apron upper member 40 to three portions of the front surface 31 of the side outer panel 3, thereby making it possible to effectively disperse the impact load.

Figure 23A:
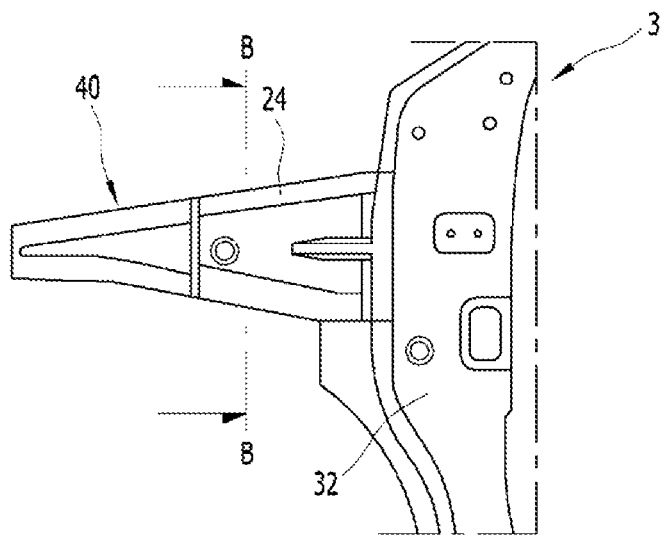
FIG. 23A and FIG. 23B are a side view of the exemplary vehicle body reinforcing structure for coping with the front collision according to the present invention.
Figure 23B:
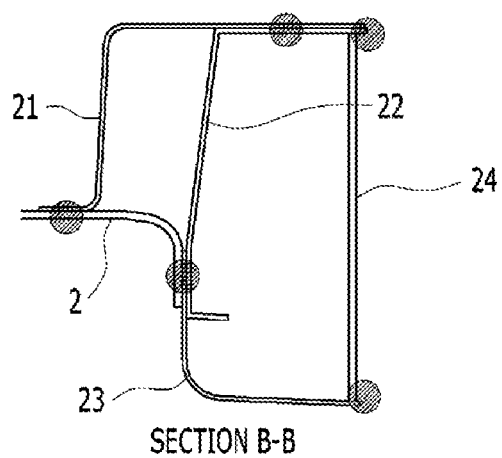

Referring to FIG. 23A and FIG. 23B, the cowl side upper outer panel 24 has one end coupled to the fender apron upper member 40 and the other end coupled to the side surface 32 of the side outer panel 3 directed outwardly in the width direction of the vehicle to transfer the impact load transferred from the fender apron upper member 40 to the side surface of the side outer panel 3 and increase coupling rigidity between the cowl side upper member 20 and the side outer panel 3.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body reinforcing structure for coping with a front collision, comprising:
    a cowl panel extended in a width direction of a vehicle;
    cowl side upper members coupled to front end portions of both sides of the cowl panel in the width direction of the vehicle and extended in a length direction of the vehicle;
    fender apron upper members extended in the length direction of the vehicle and coupled to front end portions of a front of the cowl side upper members in the length direction of the vehicle; and
    side outer panels extended in a height direction of the vehicle and connected to the front end portions of both sides of the cowl panel in the width direction of the vehicle and the cowl side upper members,
    wherein each cowl side upper member is connected to the cowl panel so as to transfer a load to the each cowl side upper member through a first load transfer path and is connected to each side outer panel so as to transfer a load to the each side outer panel through a second load transfer path,
    wherein the each side outer panel has a front surface directed toward a front in the length direction of the vehicle and a side surface directed toward a side of the vehicle;
    wherein the second load transfer path includes:
        a 2-1-th load transfer path formed by connecting the each cowl side upper member to the front surface of the side outer panel; and
        a 2-2-th load transfer path formed by connecting the each cowl side upper member to the side surface of the side outer panel, and
    wherein the each cowl side upper member further includes a reinforcing member connected to each fender apron upper member and the front surface of the side outer panel to form the 2-1-th load transfer path.

2. The vehicle body reinforcing structure for coping with the front collision of claim 1, wherein the first and second load transfer paths simultaneously receive the load transferred from the fender apron upper member and disperse the load.

3. The vehicle body reinforcing structure for coping with the front collision of claim 2, wherein the first and second load transfer paths disperse the load transferred from the fender apron upper member to two parts to substantially form a "Y" shape.

4. The vehicle body reinforcing structure for coping with the front collision of claim 1, wherein the each cowl side upper member is formed in a box shape, and includes a front portion and a rear portion positioned at a front and a rear, respectively, in the length direction of the vehicle, so that a width thereof is expanded from the front portion toward the rear portion.

5. The vehicle body reinforcing structure for coping with front collision of claim 1, wherein the each cowl side upper member includes a cowl side upper inner member connected to each of the fender apron upper member and the cowl panel to form the first load transfer path.

6. The vehicle body reinforcing structure for coping with the front collision of claim 5, wherein the each cowl side upper inner member includes:
    a member body having a first surface extended in the height direction and the length direction of the vehicle and having a plate shape and a second surface bent and extended from one side edge of the first surface in the width direction of the vehicle and having a plate shape and substantially formed in an "L" shape; and a plurality of flanges formed integrally with the member body so as to be bent from the member body and attached to the cowl panel by welding.

7. The vehicle body reinforcing structure for coping with the front collision of claim 6, wherein the second surface has a hole for a welding gun formed therein so as to penetrate therethrough.

8. The vehicle body reinforcing structure for coping with the front collision of claim 1, wherein the reinforcing member includes:
a member body having a first surface extended in the height direction and the length direction of the vehicle and having a plate shape and a second surface bent and extended from one side edge of the first surface in the width direction of the vehicle and having a plate shape and substantially formed in an "L" shape; and
a plurality of flanges formed integrally with the member body so as to be bent from the member body and attached to the front surface of respective side outer panel by welding.

9. The vehicle body reinforcing structure for coping with the front collision of claim 8, wherein the first surface is provided with a plurality of beads extended in the length direction of the vehicle in order to reinforce rigidity, the plurality of beads being disposed so as to be spaced from each other by predetermined spaces in the height direction of the vehicle.

10. The vehicle body reinforcing structure for coping with the front collision of claim 1, wherein the each cowl side upper member further includes a cowl side upper outer member connected to respective fender apron upper member and the side surface of the side outer panel to form the 2-2-th load transfer path.

11. The vehicle body reinforcing structure for coping with the front collision of claim 10, wherein the each cowl side upper outer member includes:
a member body extended in the height direction and the length direction of the vehicle and having a trapezoidal plate shape;
first to third flanges bent and extended from edges of the member body; and
a fourth flange formed integrally with the member body so as to be extended from an edge of the member body,
the member body being formed so that a width thereof is expanded from a front portion thereof in the length direction of the vehicle toward a rear portion thereof.

12. The vehicle body reinforcing structure for coping with the front collision of claim 11, wherein the member body is provided with a first bead protruding inwardly in the width direction of the vehicle and extended in the length direction of the vehicle, and is provided with a second bead protruding outwardly in the width direction of the vehicle and extended from the fourth flange in the length direction of the vehicle.

13. The vehicle body reinforcing structure for coping with the front collision of claim 1, wherein the each side outer panel is connected to a front pillar disposed at a front in the length direction of the vehicle.

14. The vehicle body reinforcing structure for coping with the front collision of claim 1, wherein the each cowl side upper member further includes a cowl side upper lower member connected to each of the respective fender apron upper member, the cowl panel, and the respective side outer panel to form a fourth load transfer path.

15. The vehicle body reinforcing structure for coping with the front collision of claim 14, wherein the each cowl side upper lower member includes:
a member body having a first surface extended in the height direction and the length direction of the vehicle and having a plate shape and a second surface bent and extended from one side edge of the first surface in the height direction of the vehicle and having a plate shape and substantially formed in an "L" shape; and
a plurality of flanges formed integrally with the member body so as to be extended from the member body,
wherein the plurality of flanges includes:
a first flange extended from the first surface to the second surface and bonded to the respective fender apron upper member, a second flange extended from the second surface and bonded to a first surface of the reinforcing member, a third flange bent and extended from one side edge of the second surface and attached to the cowl panel, a fourth flange bent and extended from an upper end portion of the second surface and attached to the front surface of the respective side outer panel, and a fifth flange bent from one side edge of the first surface and attached to the front surface of the respective side outer panel.

16. The vehicle body reinforcing structure for coping with the front collision of claim 14, wherein a triple load transfer path configured to transfer an impact load of the fender apron upper member from the fender apron upper member to the front surface of the side outer panel in the length direction of the vehicle is formed,
the triple load transfer path includes an upper load transfer path, a lower load transfer path, and a central load transfer path in the height direction of the vehicle and is formed by the cowl side upper lower member and the reinforcing member each having first ends attached to the fender apron upper member and second ends attached to the front surface of the side outer panel.

17. The vehicle body reinforcing structure for coping with the front collision of claim 1, wherein the each fender apron upper member has a structure of a rectangular box shape, and includes:
a fender apron upper inner member having upper and lower surfaces of the rectangular box shape in the height direction of the vehicle, an inner side surface of the rectangular box shape in the width direction of the vehicle, a substantially "C" shaped cross section, and an opened surface of the rectangular box shape opened outwardly in the width direction of the vehicle;
a fender apron upper outer member coupled to the fender apron upper inner member so as to close the opened surface of the fender apron upper inner member in order to form an outer side surface of the rectangular box shape in the width direction of the vehicle;
a front bracket disposed at a front in the length direction of the vehicle and coupled to the fender apron upper inner member and the fender apron upper outer member so as to close a front opening part formed by the fender apron upper inner member and the fender apron upper outer member; and
a reinforcing bracket inserted into an internal space formed by coupling the fender apron upper inner member and the fender apron upper outer member to each other to thereby be coupled to the fender apron upper inner member and the fender apron upper outer member.

18. The vehicle body reinforcing structure for coping with the front collision of claim 17, wherein the reinforcing bracket includes:
- a bracket body having a rectangular flat panel shape;
- an upper flange bent perpendicularly along an upper edge of the bracket body, formed integrally with the bracket body, and coupled to the upper surface of the fender apron upper inner member;
- a lower flange bent perpendicularly along a lower edge of the bracket body, formed integrally with the bracket body, and coupled to the lower surface of the fender apron upper inner member;
- an inner flange bent perpendicularly along an inner edge of the bracket body, formed integrally with the bracket body, and coupled to the inner side surface of the fender apron upper inner member by welding; and
- an outer flange bent perpendicularly along an outer edge of the bracket body, formed integrally with the bracket body, and coupled to an inner side surface of the fender apron upper outer member by welding.

\* \* \* \* \*